(12) United States Patent
Deshpande et al.

(10) Patent No.: US 10,607,275 B2
(45) Date of Patent: Mar. 31, 2020

(54) SYSTEM AND METHOD FOR SHORTCUTTING ORDER FULFILLMENT DECISIONS

(71) Applicant: International Business Machines Corporation, Armonk, NY (US)

(72) Inventors: Ajay A. Deshpande, White Plains, NY (US); Arun Hampapur, Norwalk, CT (US); Xuan Liu, Yorktown Heights, NY (US); Brian L. Quanz, Yorktown Heights, NY (US); Dahai Xing, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 15/153,798

(22) Filed: May 13, 2016

(65) Prior Publication Data

US 2017/0330266 A1 Nov. 16, 2017

(51) Int. Cl.
*G06Q 30/00* (2012.01)
*G06Q 30/06* (2012.01)
(Continued)

(52) U.S. Cl.
CPC ....... *G06Q 30/0635* (2013.01); *G06Q 10/067* (2013.01); *G06N 5/003* (2013.01);
(Continued)

(58) Field of Classification Search
CPC .................................................. G06Q 30/00
See application file for complete search history.

(56) References Cited

U.S. PATENT DOCUMENTS 6,662,199 B1 * 12/2003 Flight ............... G06Q 10/06
707/694
7,513,418 B2 * 4/2009 Dragt ............... G06Q 20/10
235/379

(Continued)

FOREIGN PATENT DOCUMENTS

WO   WO 2015/137879 A1   9/2015

OTHER PUBLICATIONS

Ulku, Muhammed, Analysis of Shipment Consolidation in the Logistic Supply Chain, University of Waterloo, Canada, circa 2009. (Year: 2009).*

(Continued)

*Primary Examiner* — Mark A Fadok
(74) *Attorney, Agent, or Firm* — Scully, Scott, Murphy & Presser, P.C.; Joseph Petrokaitis

(57) ABSTRACT

A method is provided for determining an order fulfillment by a simplified fulfillment deciding engine or a full fulfillment deciding engine. This method includes several steps, including determining whether the number of nodes considered in making the fulfillment order decision of the current order can be a second number of node decisions, automatically transmitting the current order to one of a simplified fulfillment deciding engine and the full fulfillment deciding engine, the simplified fulfillment deciding engine considering the second number of node decisions in making the fulfillment order decision, wherein the current order is transmitted to the simplified fulfillment deciding engine when the number of node decisions is equal to the second number of node decisions.

17 Claims, 8 Drawing Sheets

(51) Int. Cl.
*G06Q 10/06* (2012.01)
*G06N 7/00* (2006.01)
*G06N 20/10* (2019.01)
*G06N 20/20* (2019.01)
*G06N 5/00* (2006.01)
*G06N 5/02* (2006.01)

(52) U.S. Cl.
CPC ............ *G06N 5/025* (2013.01); *G06N 7/005* (2013.01); *G06N 20/10* (2019.01); *G06N 20/20* (2019.01)

(56) References Cited

U.S. PATENT DOCUMENTS

| | | | | |
|---|---|---|---|---|
| 8,374,922 | B1* | 2/2013 | Antony | G06Q 30/00 705/26.1 |
| 8,860,984 | B2 | 10/2014 | Dumitrescu et al. | |
| 2007/0138257 | A1* | 6/2007 | Dragt | G06Q 20/10 235/379 |
| 2008/0015943 | A1* | 1/2008 | Kahlon | G06Q 10/08 705/22 |
| 2011/0066493 | A1* | 3/2011 | Faith | G06Q 20/40 705/14.49 |
| 2012/0042039 | A1 | 2/2012 | Mark | |
| 2013/0132275 | A1* | 5/2013 | Enzaldo | G06Q 40/02 705/44 |
| 2015/0052019 | A1* | 2/2015 | Field-Darraugh | G06Q 30/0635 705/26.62 |
| 2015/0095097 | A1* | 4/2015 | DeJardine | G06Q 10/0633 705/7.27 |

OTHER PUBLICATIONS

Acimovic J. A., "Lowering Outbound Shipping Costs in an Online Retail Environment by Making Better Fulfillment and Replenishment Decisions",, MIT PhD Thesis, pp. 1-198 (Aug. 2012).

Baixauli-Soler J.S. et al., "A Naive Approach to Speed Up Portfolio Optimization Problem Using a Multiobjective Genetic Algorithm", Investigaciones Europeas de Direccion y Economia de la Empresa 18:126-131 (2012).

Bertsimas D. et al., "Constructing Uncertainty Sets for Robust Linear Optimization", Operations Research 57 (6):1483-1495 (Nov.-Dec. 2009).

Kewill Corporation, "Omni-Channel Optimization for Retailers: Fulfillment Best Practice to Deliver on Customer Promises and Drive Down Returns", pp. 1-12 (Jul. 2013).

Mell P., et al., "The NIST Definition of Cloud Computing", NIST Special Publication 800-145, National Institute of Standards and Technology, U.S. Department of Commerce, pp. 1-7 (Sep. 2011).

Surti V.H. et al., "Modal Split of Freight Traffic", Traffic Quarterly 26:575-588 (2001).

Xu P.J. et al., "Order Fulfillment in Online Retailing: What Goes Where", MIT Thesis, pp. 1-146 (Sep. 2005).

Quanz B. et al., "Learning to Shortcut and Shortlist Order Fulfillment Deciding", Proceedings of the 2015 INFORMS Workshop on Data Mining and Analytics (6 pages) (Oct. 31, 2015).

* cited by examiner

SYSTEM AND METHOD FOR SHORTCUTTING ORDER FULFILLMENT DECISIONS

FIELD

The present application relates generally to computers, and computer applications, and more particularly to a computer-implemented method and system to provide customer order fulfillments in a retail supply network.

BACKGROUND

Typically when an individual orders one or more items from an online retailer that online retailer assigns the fulfillment of that order to one or more nodes, which can be any combination of fulfillment centers, retail stores that are capable from fulfilling orders from the retail stores themselves, or any other entities holding inventory that are capable of fulfilling orders themselves This assignment typically only takes into account availability of the ordered item or items at the nodes, or the shipping cost of the ordered item or items from the nodes. This assignment also typically proceeds through a full decision process for each order regardless of type of items ordered or number of items ordered.

The typical assignment cannot differentiate between orders that can be safely fulfilled by a simplified fulfillment deciding engine and orders that can most likely only be optimally fulfilled by a full fulfillment deciding engine. A simplified deciding engine can be more efficient and much less resource-intensive, but incapable of finding the most cost-effective assignment for all orders.

What is desired is a system and method that can determine whether and how a current order can be safely fulfilled by a simplified fulfillment deciding engine or should instead be fulfilled by a full fulfillment deciding engine.

BRIEF SUMMARY

A method is provided for determining an order fulfillment by a simplified fulfillment deciding engine or a full fulfillment deciding engine, and determining when to use which engine, based on the characteristics of the order, past fulfillment decisions, and the current state of the fulfillment network.

One embodiment of this method includes the following steps: receiving by a computer processor of a fulfillment shortcutting deciding engine an electronic record of a current order from a customer, the computer processor of the fulfillment shortcutting deciding engine having program instructions, which when executed by the processor of the fulfillment shortcutting deciding engine perform the steps of; retrieving historical data used by a full fulfillment deciding engine in making order fulfillment decisions of a plurality of previous orders, the full fulfillment deciding engine considering a first number of node decisions in making the fulfillment order decision; determining whether the number of nodes considered in making the fulfillment order decision of the current order can be a second number of node decisions, the second number of node decisions being less than the first number of node decisions, automatically transmitting the current order to one of a simplified fulfillment deciding engine and the full fulfillment deciding engine, the simplified fulfillment deciding engine considering the second number of node decisions in making the fulfillment order decision, wherein the current order is transmitted to the simplified fulfillment deciding engine when the number of node decisions is equal to the second number of node decisions.

A computer readable storage medium storing a program of instructions executable by a machine to perform one or more methods described herein also may be provided.

A system for providing an order fulfillment, comprising one or more storage devices and one or more hardware processors described herein also may be provided.

Further features as well as the structure and operation of various embodiments are described in detail below with reference to the accompanying drawings. In the drawings, like reference numbers indicate identical or functionally similar elements.

DETAILED DESCRIPTION

The disclosure is directed to a computer system and computer-implemented method to generate sourcing decisions for omni-channel fulfillment in retail supply networks that determines whether a current order can be fulfilled by a simplified fulfillment deciding engine or fulfilled by a full fulfillment deciding engine.

The computer system and computer-implemented method exemplifies an improvement to order fulfillment determination processes. As used herein the term node refers to a retailer's shipping and fulfillment center as well as a retailer's commercial store, or any other entity or service that is capable of fulfilling orders placed by customers through the internet.

While eligible nodes for order fulfillment have been typically determined by a single, robust determination process, this typical method is unable to take into account identifying features of an order that would allow a shortcut or simplified determination process of the order fulfillment.

Implementing the system and computer-implemented methods described herein, the decision on whether an order fulfillment is to be decided by a simplified fulfillment deciding engine or a full fulfillment deciding engine can be made based on identifying features of the current order, which are discussed herein.

Deciding an order fulfillment with the simplified fulfillment engine ensures that the current order fulfillment decision can be made while using fewer resources, such as processing resources.

Figure 1:
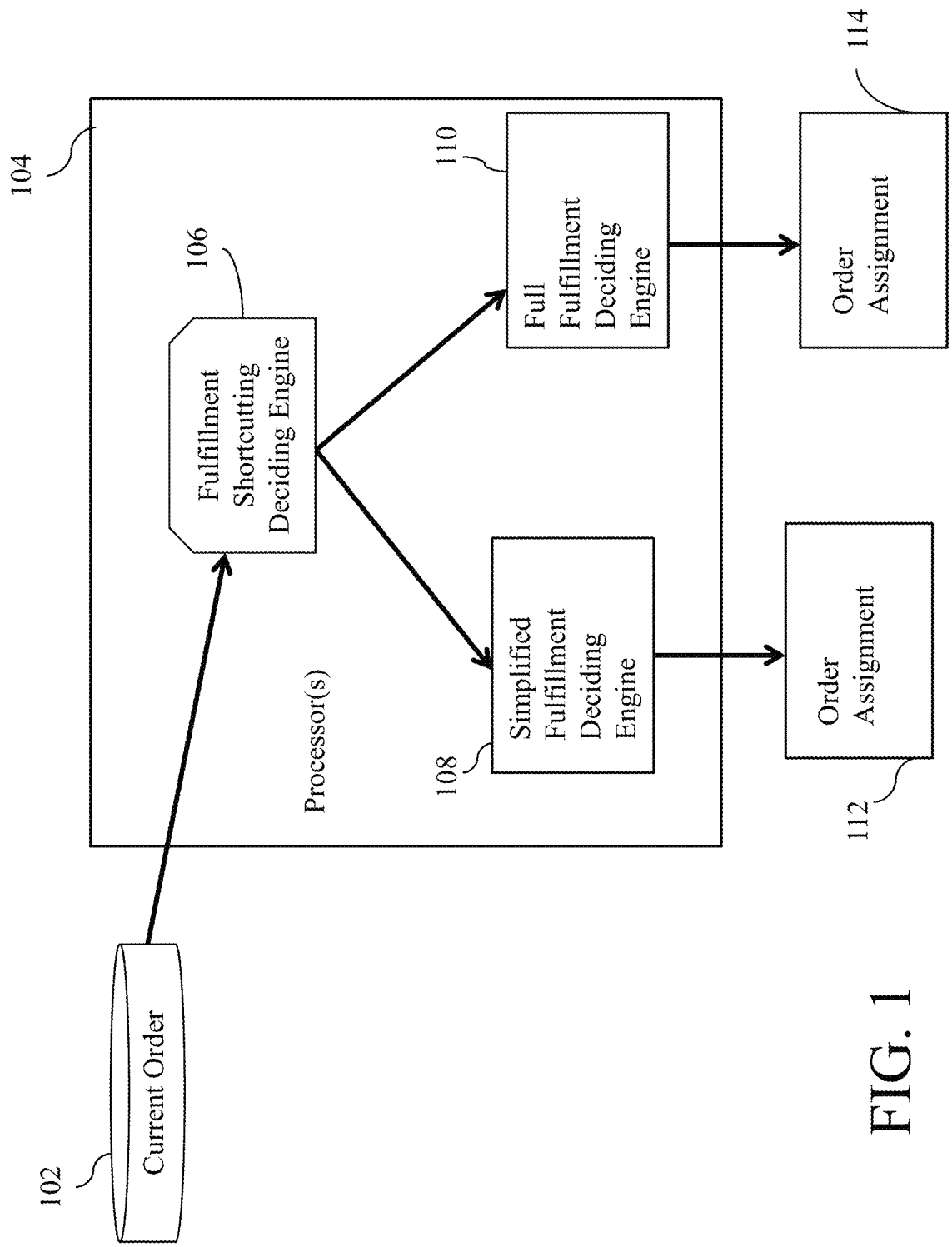
FIG. 1 is an overall system diagram of a system environment running methods described herein.
Figure 2:
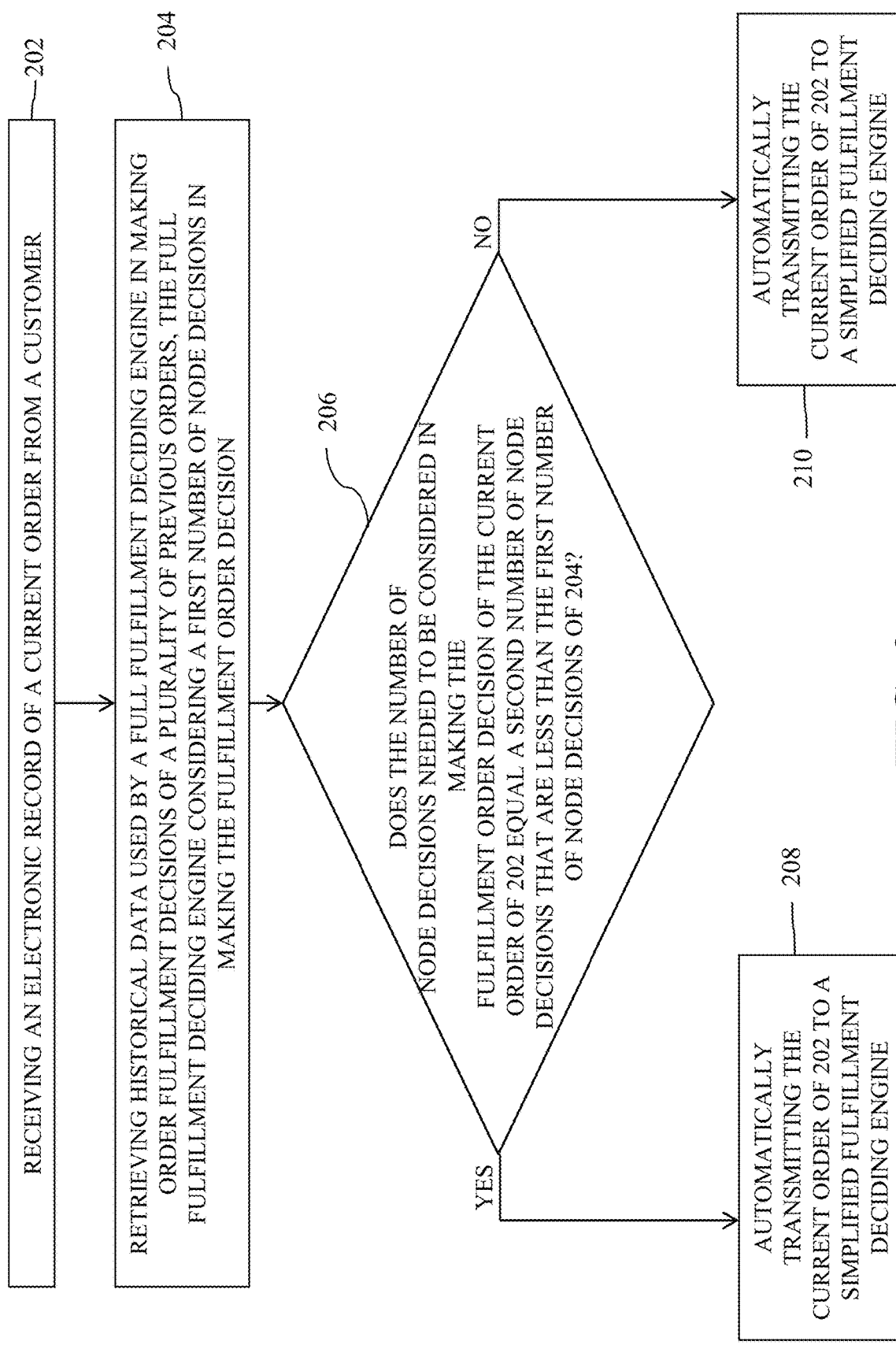
FIG. 2 is a flow diagram illustrating a method of order fulfillment deciding in one embodiment of the present disclosure.

In a method for determining an order fulfillment, one or more processors of a computer are implemented to determine whether a current order is to be transmitted to a simplified fulfillment deciding engine or a full fulfillment deciding engine. FIG. 1 depicts the computer system that provides a method for determining an order fulfillment. In particular, FIG. 1 illustrates the receipt of a current order 102 by one or more hardware processors 104. Included as part of the one or more hardware processors are a fulfillment shortcutting deciding engine 106, a simplified fulfillment deciding engine 108 and a full fulfillment deciding engine 110. A flow diagram of the method is shown in FIG. 2. Receipt of an electronic record of the current order from the customer is step 202 of FIG. 2.

As can be seen from FIG. 1, one of the simplified fulfillment deciding engine 108 and the full fulfillment deciding engine 110 are configured to receive a transmission from the fulfillment shortcutting deciding engine 106, in step 208 of FIG. 2. The use of the simplified fulfillment deciding engine 108 and the use of the full fulfillment deciding engine 110 are discussed below.

After receipt of the current order 102 from the customer, the fulfillment shortcutting deciding engine 106 retrieves, by a computer processor of the fulfillment shortcutting deciding engine 106, historical data used by the full fulfillment deciding engine 108 when making order fulfillment decisions of a plurality of previous orders, in step 204 of FIG. 2. When making those order fulfillment decisions of a plurality of previous orders, the full fulfillment deciding engine 108 considered a first number of node decisions. The first number of node decisions includes a fulfillment decision for each of an entire number of nodes or a specified subset of the entire number of nodes.

The retrieved historical data can include several different data elements of a plurality of previously fulfilled orders. Some of this historical data includes, for example, item or items of the current order; ordered quantity for each item of the current order; destination of the current order; shipping weight of the current order; cost of the current order; price of the current order; present demand of the current order; type of node, wherein the node is selected from a shipment facility and a retail store; distance between the node and the destination of the current order; inventory at the node for the current order; shipping cost of the current order from the node to the destination; previous orders of the item or items of the current order from the node; and projected future price of the item or items of the current order. It can also include characteristics of the fulfillment network itself at that time, such as number of units a node has been assigned for fulfillment so far. This historical data can be continually updated upon fulfillment of newly received orders by the full fulfillment engine 108.

After the fulfillment shortcutting deciding engine 106 retrieves the first number of node decisions, the fulfillment shortcutting deciding engine 106 decides whether the number of nodes considered in making the fulfillment order decision of the current order can be a second number of node decisions that is less than the first number of node decisions, in step 206 of FIG. 2. The second number of node decisions can be different than the first number of node decisions if one or more of the first number of node decisions is eliminated. Examples of the reduction in node decisions are discussed below.

If the fulfillment shortcutting deciding engine 106 decides that yes, the second number of node decisions are less than the first number of node decisions, or less than or equal to a predetermined number, then it automatically transmits the current order to the simplified fulfillment deciding engine 108, in step 208 of FIG. 2. If the fulfillment shortcutting deciding engine 106 decides that no, the second number of node decisions is not less than the first number of node decisions, the fulfillment shortcutting deciding engine 106 automatically transmits the current order to the full fulfillment deciding engine 108, in step 210 of FIG. 2. In other words, the historical data does not reveal that a simplified fulfillment decision process cannot be used.

If the fulfillment shortcutting deciding engine 106 automatically transmits the current order to the simplified fulfillment deciding engine 108, then the simplified fulfillment deciding engine 108 will only consider the second number of node decisions when making the fulfillment order decision. If the simplified fulfillment deciding engine 108 receives the current order, the simplified fulfillment deciding engine 108 makes an order assignment decision 112, based on the second number of node decisions, and assigns the current order to one or more nodes for fulfillment. If the full fulfillment deciding engine 110 receives the current order, the full fulfillment deciding engine 110 makes an order assignment decision 114, based on the first number of node decisions, and assigns the current order to one or more nodes for fulfillment.

Figure 3:
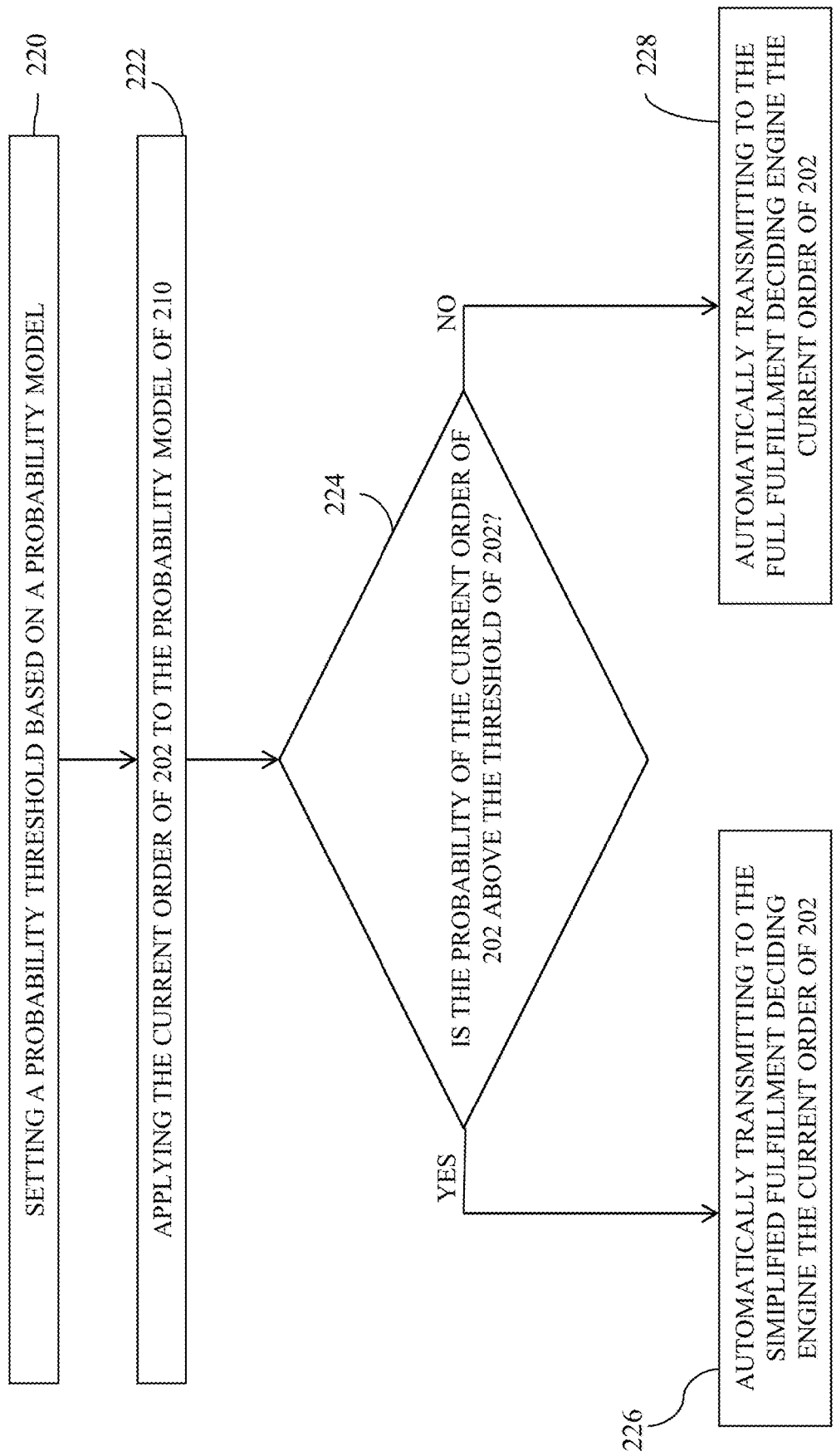
FIG. 3 is a flow diagram illustrating a method of order fulfillment deciding in another embodiment of the present disclosure.

The fulfillment shortcutting deciding engine 106 can determine whether the number of nodes considered in making the fulfillment order decision can be the second number of node decisions with a probability model based on the received historical data. A flow diagram of this embodiment is shown in FIG. 3. This determination of the fulfillment shortcutting deciding engine can be automatically generated by a computer processor of the fulfillment shortcutting deciding engine 106.

Various probability models can be utilized by the fulfillment shortcutting deciding engine 106, including but not limited to logistic regression, decision trees, random forests, generalized linear regression, support vector machines, deep belief/neural networks, Bayesian nonparametric methods, kernel methods, association rules, etc. Each of these models, and other logistic models, can be compared by the fulfillment shortcutting deciding engine 106, or another suitable processor, to the received historical data to determine which model provides the highest accuracy based on the received historical data.

Along with the probability model, the fulfillment shortcutting deciding engine 106 can set a probability threshold, in step 220 of FIG. 3. This probability threshold can be set based on a retailer's business decisions and can be changed over time. The fulfillment shortcutting deciding engine 106 can also apply the current order to the probability model, in step 222 of FIG. 3, to decide whether the probability of the current order being eligible for the simplified fulfillment deciding engine is above the probability threshold, in step 224 of FIG. 3. That is, this captures the probability that the simplified deciding engine can determine the optimal or near-optimal order assignment that would be determined by the full deciding engine, based on the characteristics of the order, past fulfillment decisions, and the current state of the fulfillment network.

If the fulfillment shortcutting deciding engine 106 decides that yes, the probability of the current order being eligible for the simplified fulfillment deciding engine is above the probability threshold, the fulfillment shortcutting deciding engine 108 automatically transmits the current order to the simplified fulfillment deciding engine 108, in step 226 of FIG. 3. If the fulfillment shortcutting deciding engine 106 decides that no, the probability of the current order being eligible for the simplified fulfillment deciding engine is not above the probability threshold, the fulfillment shortcutting deciding engine 108 automatically transmits the current order to the full fulfillment deciding engine 110, in step 228 of FIG. 3.

Examples of probability thresholds are discussed below.

The fulfillment shortcutting deciding engine 106 can set a single sourcing node probability threshold based on the model. This single sourcing node probability threshold can be based on, for example, the number of items of the current order, the total quantity of items, the percentage of different node eligibilities of the items in the order, a minimum shipping cost for shipping one package as compared to the shipping cost for shipping multiple packages, a maximum difference in markdown savings for item(s) of the order, a number of nodes with each item(s) of the order in inventory and whether a node is a retailer's shipping and fulfillment center or a retailer's commercial store that is capable of fulfilling orders placed by customers through the internet. The model can also be used to determine which of these features are the best to include to accurately determine the single sourcing node probability.

One example of the single sourcing node probability threshold model is the following logistic model: P(Order is shipped in two or more packages|order feature $1=a_1$, order feature $2=a_2$, ... order feature $j=a_j)=1/(1+\exp(-(w_1 a_1+w_2 a_2+\ldots a_j+b)))$, based on historical data. Note that the probability that the order is eligible for the simplified fulfillment engine is 1 minus this probability.

In this example, a probability of the order being shipped in two or more packages, $P_{split}=f(x_1, x_2, x_3, \ldots, x_p)$, can be a factor of ($x_1$ (the number of items ordered), $x_2$ (the relative shipping cost of shipping one package), $x_3$ (maximum possible markdown savings from split shipping), $x_4$ (total weight of items ordered), with each value being based on historical data. Then: $f(x_1, x_2, x_3, x_4)=1/(1+\exp(-w_1 x_1-w_2 x_2-\ldots-w_p x_p-b))$, to determine a probability threshold.

Figure 4:
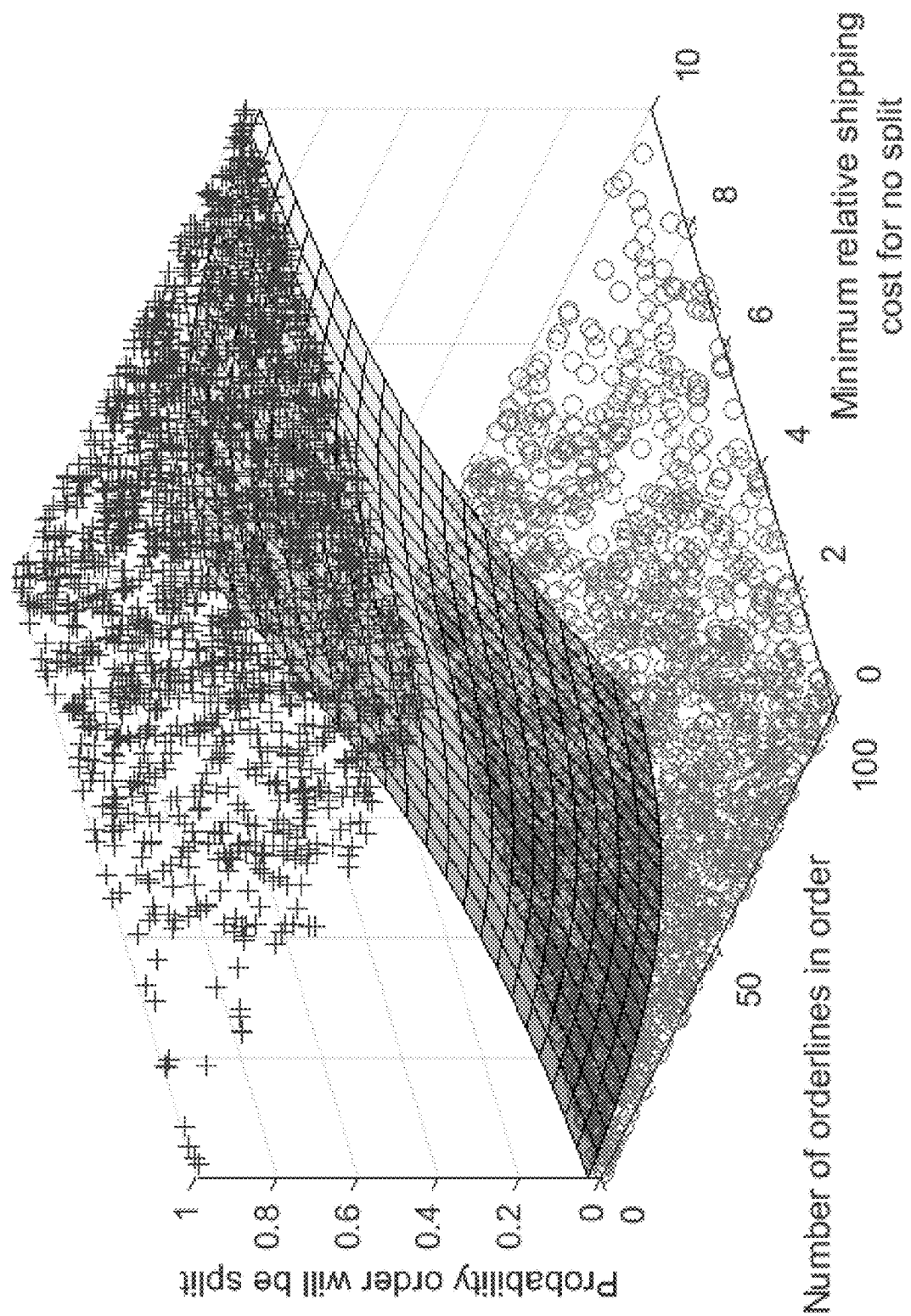
FIG. 4 is an illustration of a probability model used in order fulfillment deciding.

In another example, a probability computation can be performed using two or more factors of historical data, such as number of items ordered and minimum relative shipping cost for shipping a single package. The computation is illustrated in FIG. 4. As can be seen in FIG. 4, the cross data points are historical data points when an order was shipped as two or more packages while the circle data points are when an order was shipped as a single package, with a modeled probability curve placed between the data points. The z-axis of FIG. 4 illustrates the probability of the current order being split based on the number of items ordered and minimum relative shipping cost for shipping a single package.

Under this second example, if a number of items ordered was 2, and the total weight of the items was 5, $P_{split}=(2, 5 \ldots )=0.01$. If the probability the order will not be split=$1-P_{split}=1-0.01=0.99>$a predetermined threshold, then the current order is sent to the simplified fulfillment deciding engine 226. That is, if it is predicted the order will not be split with high enough confidence, then the order can be sent to the simplified fulfillment deciding engine.

Referring again to the fulfillment shortcutting deciding engine 106 setting a single sourcing node probability threshold based on the model, the fulfillment shortcutting deciding engine 106 then applies the current order to the single sourcing node probability model and determines the probability of the current order relative to the single sourcing node probability threshold. This probability of the current order is the probability of the current order being assigned to a single node, if the assignment were decided by the full fulfillment deciding engine. If the probability of the current order is below the single sourcing node probability threshold, the fulfillment shortcutting deciding engine 106 automatically transmits the current order to the full fulfillment deciding engine 110. If the probability of the current order is above the single sourcing node probability threshold, the fulfillment shortcutting deciding engine 106 automatically transmits the current order to the simplified fulfillment deciding engine 108.

As an example of the single sourcing node probability, if the current order is a single item, the current order has a 100% chance of being shipped from a single source, while a current order with two or more items has a quantifiably smaller chance of being shipped from a single source. When the current order is a single item order, or a multiple item order above the threshold, that current order is automatically transmitted to the simplified fulfillment deciding engine 108.

The fulfillment shortcutting deciding engine 106 can also set a similar order detail probability threshold based on the model.

Figure 5:
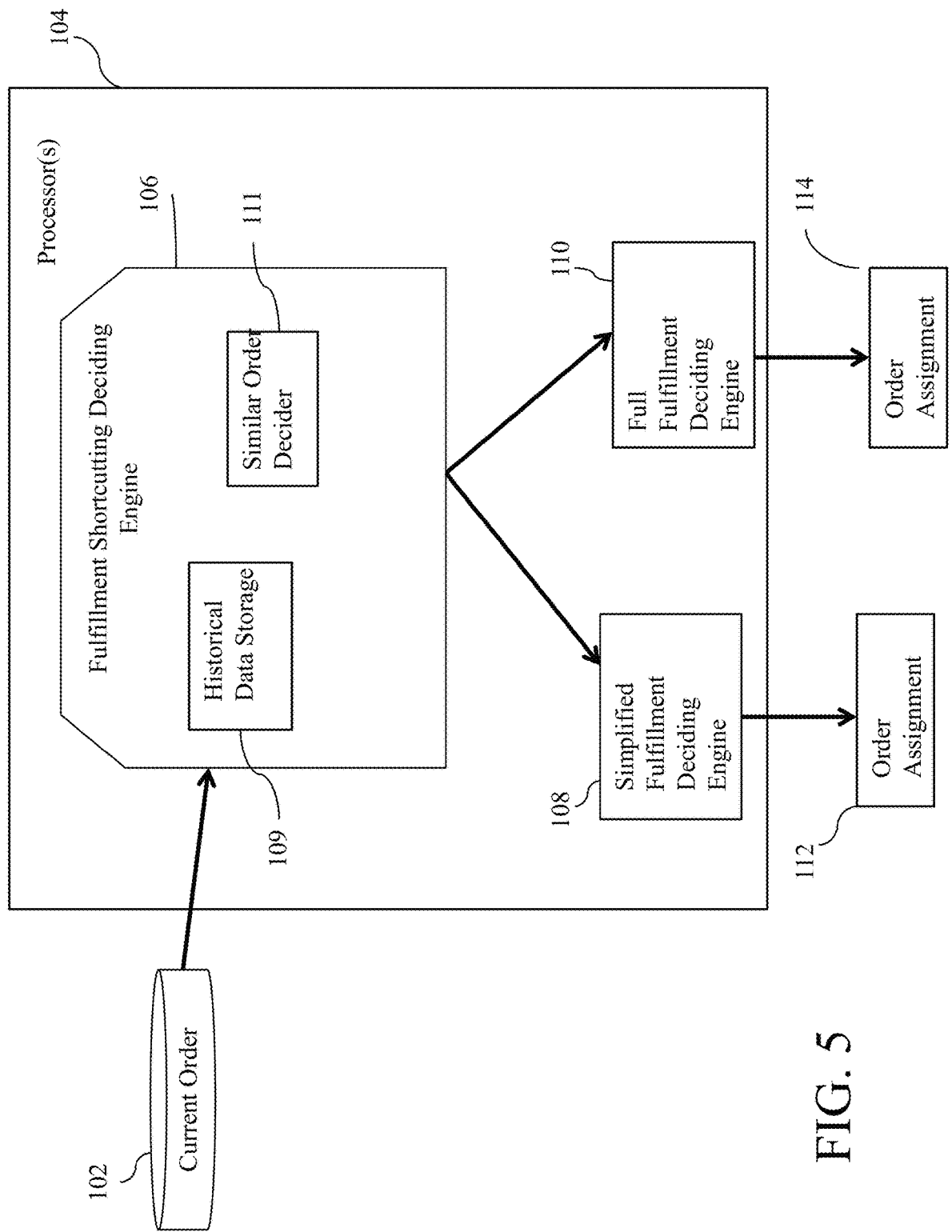
FIG. 5 is a system diagram of a system environment running a method described herein.

FIG. 5 is an example of a system diagram of a system for determining the similar order detail probability. Many of the components are the same as those discussed in FIG. 1 and operate in a similar fashion. As can be seen from FIG. 5, the fulfillment shortcutting deciding engine 106 includes (or has access to) a historical data storage 109 and a similar order decider 111.

This historical data storage 109 includes an updated set of data, including what item(s) constituted previous orders, which nodes the previous orders were assigned to for fulfillment, and how much time has passed between the previous order and receipt of the current order. For example, historical data that is less than one week before the current order can have a higher weight in the historical data storage 109 as compared to historical data of greater than one week before the current order.

The similar order decider 111 determines, from historical storage 109, one or more similar previous orders with a similarity to the current order. The similar order decider 111 can make this determination based on zip code of the current order, item(s) of the current order, quantities of items of the current order as they each compare to the similar previous orders.

Specifically, the fulfillment shortcutting deciding engine 106 applies the current order to the similar order detail probability model and determines the probability of the current order being fulfilled in the same way as the similar previous orders relative to the similar order detail probability threshold. If the probability of the current order is below the similar order detail probability threshold, the fulfillment shortcutting deciding engine 106 automatically transmits the current order to the full fulfillment deciding engine 110. If the probability of the current order is above the single sourcing node probability threshold, the fulfillment shortcutting deciding engine 106 automatically transmits the current order to the simplified fulfillment deciding engine 108.

As an example of the similar order detail probability, if the current order is for two items from one zip code, and a recent previous order is for those same two items from the same zip code, the current order would have a high chance of being shipped in the same way the previous order was. When the current order is similar enough to place the current order above the threshold, that current order is automatically transmitted to the simplified fulfillment deciding engine 108.

The fulfillment shortcutting deciding engine 106 can also set a combination probability threshold based on the model.

This combination probability model includes both a consideration of the similar order detail probability and the single sourcing node probability, both of which are described above. The fulfillment shortcutting deciding engine 106 can be adjusted to consider one probability over the other, or consider them both equally when assigning fulfillment of the current order.

The fulfillment shortcutting deciding engine 106 applies the current order to the combination probability model and determines the probability of the current order relative to the combination probability threshold. If the probability of the current order is below the combination probability threshold, the fulfillment shortcutting deciding engine 106 automatically transmits the current order to the full fulfillment deciding engine 110. If the probability of the current order is above the combination probability threshold, the fulfillment shortcutting deciding engine 106 automatically transmits the current order to the simplified fulfillment deciding engine 108.

While the above description refers to probabilities being above a threshold for consideration of the simplified fulfillment deciding engine 108, the methods and systems could be modified such that the probabilities below a threshold are transmitted to the simplified fulfillment deciding engine 108.

While the above description referred to a retailer, it should be understood that the methodology may apply to any seller of one or more products. In the claims, the terms "first" and "second" with respect to a seller are used only to differentiate one seller from another seller. Those terms do not denote any order or impart any other meaning.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 6:
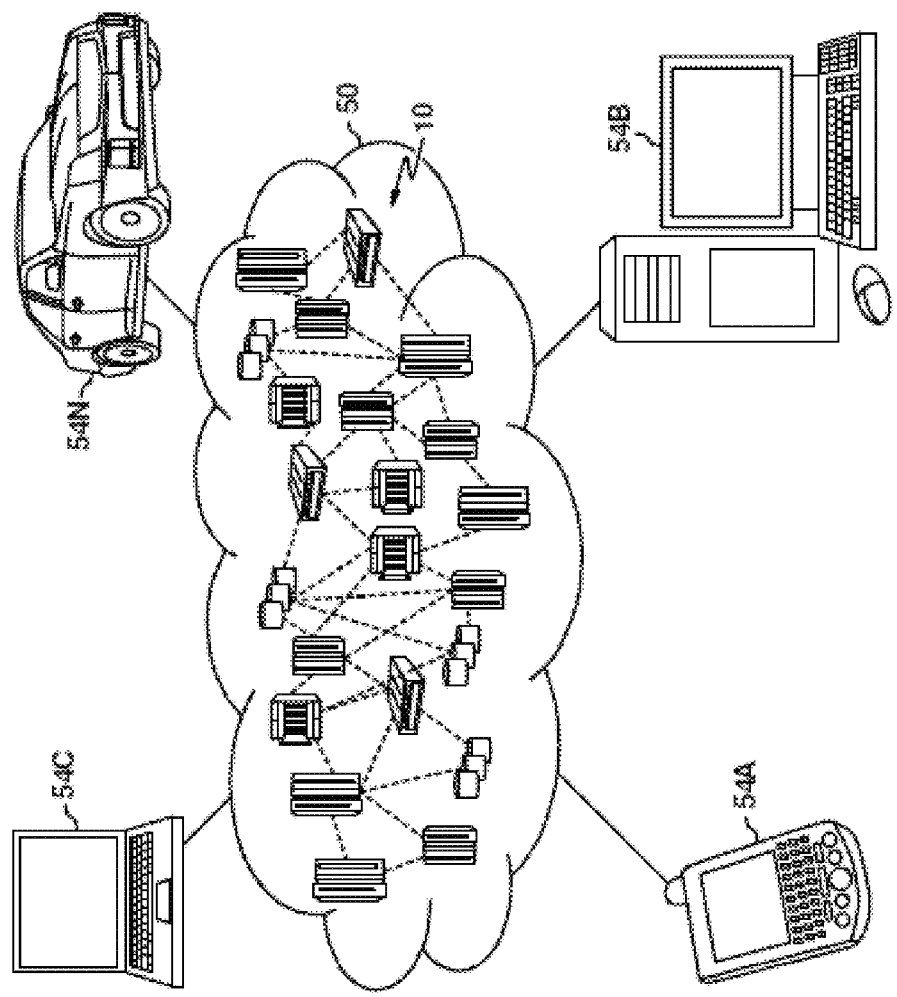
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
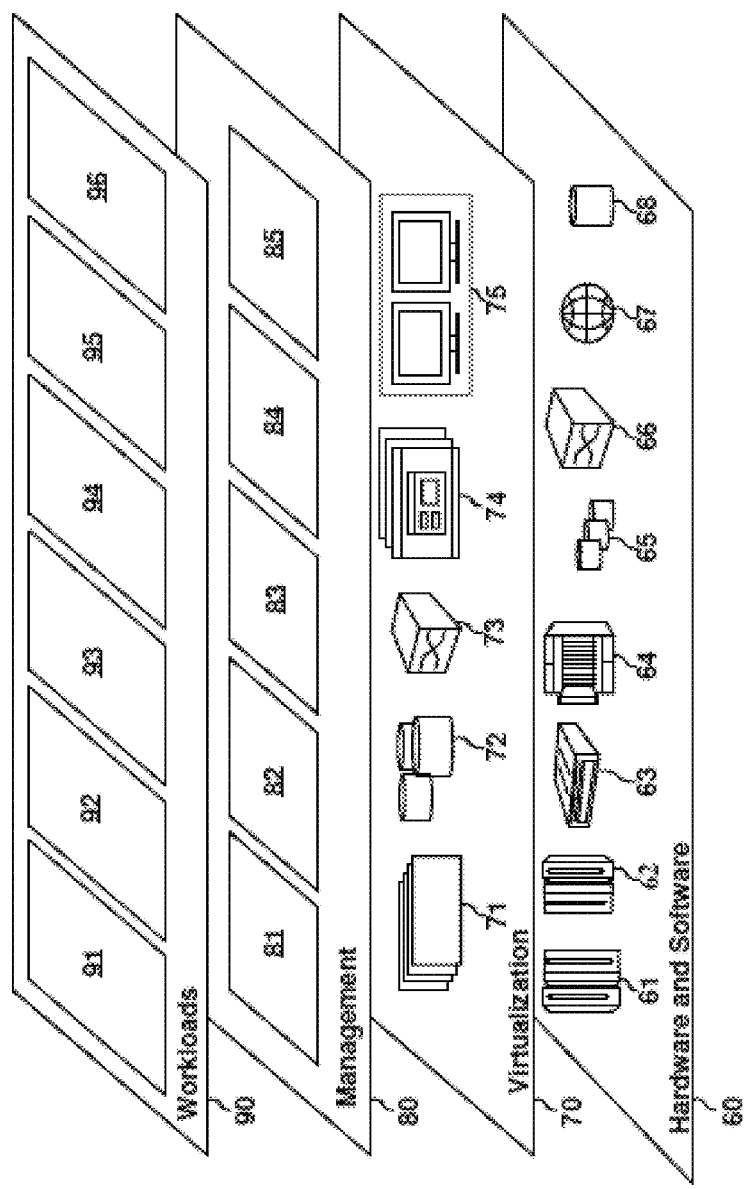
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and order fulfillment deciding 96.

Figure 8:
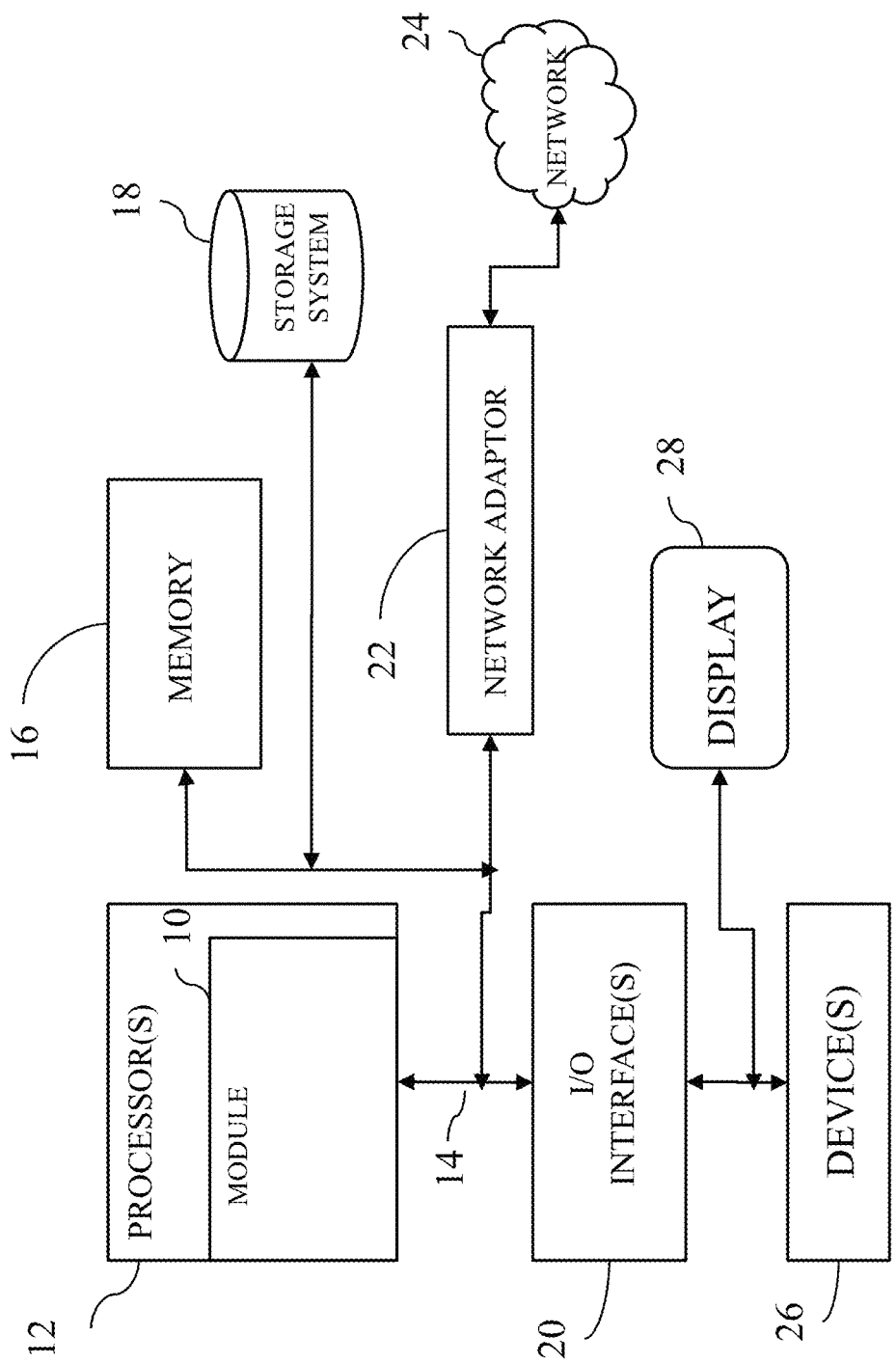
FIG. 8 illustrates a schematic of an example computer or processing system that may implement a price matching system in one embodiment of the present disclosure.

FIG. 8 illustrates a schematic of an example computer or processing system that may implement order fulfillment deciding in one embodiment of the present disclosure. The computer system is only one example of a suitable processing system and is not intended to suggest any limitation as to the scope of use or functionality of embodiments of the methodology described herein. The processing system shown may be operational with numerous computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a special purpose computer or machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer implemented method for deciding an order fulfillment, comprising:
receiving by a computer processor of a fulfillment shortcutting deciding engine an electronic record of a current order from a customer, the computer processor of the fulfillment shortcutting deciding engine having program instructions, which when executed by the processor of the fulfillment shortcutting deciding engine perform the steps of:
retrieving historical data used by a full fulfillment deciding engine in making order fulfillment decisions of a plurality of previous orders, the full fulfillment deciding engine considering a first number of node decisions in making the fulfillment order decision, wherein the first number of node decisions comprises a fulfillment decision for the number of nodes that are capable of fulfilling the current order;
automatically determining by a computer processor of the fulfillment shortcutting deciding engine whether the number of nodes considered in making the fulfillment order decision of the current order can be a second number of node decisions, the second number of node decisions being less than the first number of node decisions, with a probability model based on the historical data, wherein the probability model forms a modeled probability curve between the historical data, the historical data comprising ordered quantity for each item of the current order and minimum relative shipping cost for shipping a single package; and
automatically transmitting the current order to one of a simplified fulfillment deciding engine and the full fulfillment deciding engine, the simplified fulfillment deciding engine considering the second number of node decisions in making the fulfillment order decision, wherein the current order is transmitted to the simplified fulfillment deciding engine when the number of node decisions is equal to the second number of node decisions.

2. The computer implemented method of claim 1, further comprising the steps of setting a probability threshold based on the probability model, applying the current order to the probability model and determining a probability of the current order relative to the threshold; wherein the current order being below the probability threshold is automatically transmitted to the full fulfillment deciding engine and the current order being above the probability threshold is automatically transmitted to the simplified fulfillment deciding engine, prior to the step of automatically transmitting the current order to one of the simplified fulfillment deciding engine and the full fulfillment deciding engine.

3. The computer implemented method of claim 1, further comprising the steps of setting a single sourcing node probability threshold based on the model, applying the current order to the single sourcing node probability model and determining the probability of the current order relative to the threshold; wherein the current order being below the single sourcing node probability threshold is automatically transmitted to the full fulfillment deciding engine and the current order being above the single sourcing node probability threshold is automatically transmitted to the simplified fulfillment deciding engine, prior to the step of automatically transmitting the current order to one of the simplified fulfillment deciding engine and the full fulfillment deciding engine.

4. The computer implemented method of claim 1, further comprising the steps of setting a similar order detail probability threshold based on the model, applying the current order to the similar order detail probability model and determining the probability of the current order relative to the threshold; wherein the current order being below the similar order detail probability threshold is automatically transmitted to the full fulfillment deciding engine and the current order being above the similar order detail probability threshold is automatically transmitted to the simplified fulfillment deciding engine, prior to the step of automatically transmitting the current order to one of the simplified fulfillment deciding engine and the full fulfillment deciding engine.

5. The computer implemented method of claim 1, further comprising the steps of setting a combination probability threshold, wherein the combination probability threshold is determined by a combination of a similar order detail probability and a single sourcing node probability, based on the model and applying the current order to the same combination probability model and determining the probability of the current order relative to the threshold; wherein the current order being below the combination probability threshold is automatically transmitted to the full fulfillment deciding engine and the current order being above the combination probability threshold is automatically transmitted to the simplified fulfillment deciding engine, prior to the step of automatically transmitting the current order to one of the simplified fulfillment deciding engine and the full fulfillment deciding engine.

6. The computer implemented method of claim 1, wherein the historical data comprises further historical data selected from the group consisting of item or items of the current order; destination of the current order; shipping weight of the current order; cost of the current order; price of the current order; present demand of the current order; type of node, wherein the node is selected from a shipment facility and a retail store; distance between the node and the destination of the current order; inventory at the node for the current order; shipping cost of the current order from the node to the destination; previous orders of the item or items of the current order from the node; current number of items assigned to the node for fulfillment; mix of node eligibility of items of the current order; and projected future price of the item or items of the current order.

7. A system for providing an order fulfillment, comprising:
one or more storage devices;
one or more hardware processors coupled to the one or more storage devices;
one or more hardware processors operable to receive by a fulfillment shortcutting
deciding engine an electronic record of a current order from a customer,
one or more hardware processors operable to retrieve historical data used by a full fulfillment deciding engine in making order fulfillment decisions of a plurality of previous orders, the full fulfillment deciding engine considering a first number of node decisions in making the fulfillment order decision, wherein the first number of node decisions comprises a fulfillment decision for the number of nodes that are capable of fulfilling the current order;
one or more hardware processors operable to automatically determine whether the number of nodes considered in making the fulfillment order decision of the current order can be a second number of node decisions, the second number of node decisions being less than the first number of node decisions, with a probability model based on the historical data, wherein the probability model forms a modeled probability curve between the historical data, the historical data comprising ordered quantity for each item of the current order and minimum relative shipping cost for shipping a single package; and
one or more hardware processors operable to automatically transmit the current order to one of a simplified fulfillment deciding engine and the full fulfillment deciding engine, the simplified fulfillment deciding engine considering the second number of node decisions in making the fulfillment order decision, wherein the current order is transmitted to the simplified fulfillment deciding engine when the number of node decisions is equal to the second number of node decisions.

8. The system of claim 7, further comprising one or more hardware processors operable for setting a probability threshold based on the probability model, applying the current order to the probability model and determining the probability of the current order relative to the threshold; wherein the current order being below the probability threshold is automatically transmitted to the full fulfillment engine and the current order being above the probability threshold is automatically transmitted to the simplified fulfillment deciding engine.

9. The system of claim 7, further comprising one or more hardware processors operable for setting a single sourcing node probability threshold based on the model, applying the current order to the single sourcing node probability model and determining the probability of the current order relative to the threshold; wherein the current order being below the single sourcing node probability threshold is automatically transmitted to the full fulfillment engine and the current order being above the single sourcing node probability threshold is automatically transmitted to the simplified fulfillment deciding engine.

10. The system of claim 7, further comprising one or more hardware processors operable for setting a similar order detail probability threshold based on the model, applying the current order to the similar order detail probability model and determining the probability of the current order relative to the threshold; wherein the current order being below the similar order detail probability threshold is automatically transmitted to the full fulfillment engine and the current order being above the similar order detail probability threshold is automatically transmitted to the simplified fulfillment deciding engine.

11. The system of claim 7, further comprising one or more hardware processors operable for setting a combination probability threshold, wherein the combination probability threshold is determined by a combination of a similar order detail probability and a single package probability, based on the model and applying the current order to the same combination probability model and determining the probability of the current order relative to the threshold; wherein the current order being below the combination probability threshold is automatically transmitted to the full fulfillment engine and the current order being above the combination probability threshold is automatically transmitted to the simplified fulfillment deciding engine.

12. The system of claim 7, wherein the historical data comprises further historical data selected from the group consisting of item or items of the current order; destination of the current order; shipping weight of the current order; cost of the current order; price of the current order; present demand of the current order; type of node, wherein the node is selected from a shipment facility and a retail store; distance between the node and the destination of the current order; inventory at the node for the current order; shipping cost of the current order from the node to the destination; previous orders of the item or items of the current order from the node; current number of items assigned to the node for fulfillment; mix of node eligibility of items of the current order; and projected future price of the item or items of the current order.

13. A computer readable storage medium storing a program of instructions executable by a machine to perform a method of deciding an order fulfillment, the method comprising:
receiving by a computer processor of a fulfillment shortcutting deciding engine an electronic record of a current order from a customer, the computer processor of the fulfillment shortcutting deciding engine having program instructions, which when executed by the processor of the fulfillment shortcutting deciding engine perform the steps of:
retrieving historical data used by a full fulfillment deciding engine in making order fulfillment decisions of a plurality of previous orders, the full fulfillment deciding engine considering a first number of node decisions in making the fulfillment order decision, wherein the first number of node decisions comprises a fulfillment decision for the number of nodes that are capable of fulfilling the current order;

automatically determining by a computer processor of the fulfillment shortcutting deciding engine whether the number of nodes considered in making the fulfillment order decision of the current order can be a second number of node decisions, the second number of node decisions being less than the first number of node decisions, with a probability model based on the historical data, wherein the probability model forms a modeled probability curve between the historical data, the historical data comprising ordered quantity for each item of the current order and minimum relative shipping cost for shipping a single package; and automatically transmitting the current order to one of a simplified fulfillment deciding engine and the full fulfillment deciding engine, the simplified fulfillment deciding engine considering the second number of node decisions in making the fulfillment order decision, wherein the current order is transmitted to the simplified fulfillment deciding engine when the number of node decisions is equal to the second number of node decisions.

14. The computer readable storage medium of claim 13, further comprising the steps of setting a probability threshold based on the probability model, applying the current order to the probability model and determining the probability of the current order relative to the threshold; wherein the current order being below the probability threshold is automatically transmitted to the full fulfillment engine and the current order being above the probability threshold is automatically transmitted to the simplified fulfillment deciding engine, prior to the step of automatically transmitting the current order to one of the simplified fulfillment deciding engine and the full fulfillment deciding engine.

15. The computer readable storage medium of claim 13, further comprising the steps of setting a single sourcing node probability threshold based on the model, applying the current order to the single sourcing node probability model and determining the probability of the current order relative to the threshold; wherein the current order being below the single sourcing node probability threshold is automatically transmitted to the full fulfillment engine and the current order being above the single sourcing node probability threshold is automatically transmitted to the simplified fulfillment deciding engine, prior to the step of automatically transmitting the current order to one of the simplified fulfillment deciding engine and the full fulfillment deciding engine.

16. The computer readable storage medium of claim 13, further comprising the steps of setting a similar order detail probability threshold based on the model, applying the current order to the similar order detail probability model and determining the probability of the current order relative to the threshold; wherein the current order being below the similar order detail probability threshold is automatically transmitted to the full fulfillment engine and the current order being above the similar order detail probability threshold is automatically transmitted to the simplified fulfillment deciding engine, prior to the step of automatically transmitting the current order to one of the simplified fulfillment deciding engine and the full fulfillment deciding engine.

17. The computer readable storage medium of claim 13, further comprising the steps of setting a combination probability threshold, wherein the combination probability threshold is determined by a combination of a similar order detail probability and a single package probability, based on the model and applying the current order to the same combination probability model and determining the probability of the current order relative to the threshold; wherein the current order being below the combination probability threshold is automatically transmitted to the full fulfillment engine and the current order being above the combination probability threshold is automatically transmitted to the simplified fulfillment deciding engine, prior to the step of automatically transmitting the current order to one of the simplified fulfillment deciding engine and the full fulfillment deciding engine.

* * * * *